3,032,420
PROCESS FOR THE PRODUCTION OF MEAT PRODUCTS HAVING STABILIZED COLOR
John Ferrari, 224 W. Delano Ave., Yonkers, N.Y.
No Drawing. Filed Mar. 21, 1957, Ser. No. 647,501
6 Claims. (Cl. 99—107)

This invention relates to the production of a stable color in meats. More particularly, it relates to the preservation of the natural appearance of meat and meat products, fresh or cured.

A considerable number of processes have been advanced to inhibit discoloration of meats and many coloring agents have been used in coloring meats and meat products. These previous efforts have been not very satisfactory for a combination of reasons. Many of them lead to products which are too artificial in appearance; a number of the methods, while they produce a good color in the red portion of meat, fail to give a color which lasts for an adequate time. Still others produce a product in which colorless or substantially colorless portions of meat, such as fat, are colored also with the result that the natural appearance of the meat is lost.

An object of this invention is the production of meat having a stable color. Another object is the provision of a method for producing meat for packaging which has on packaging its original, natural appearance. A still further object is the provision of such meat which retains its natural appearance for a considerable time period. Other objectives appear hereinafter.

These objects are accomplished by this invention which comprises preparing an aqueous mixture of a certified monoazo dye, that is a dye certified by the Federal Government for use in foods which dye is substantially red in color. The solution is aged and then blended with meat and the resultant blend is aged. For example, the coloring material selected may be from the group consisting of F.D. & C. Red #2, CSC Strawberry Shade and/or Brilliant Christmas Red Shade, and the aging of the solution, the mixing of the resultant, specially prepared solution with the meat to be treated and the aging of the resultant mixture are done under special conditions to develop and stabilize the color, it being understood that as of the filing date F.D. & C. Red #1 was certified and Christmas Red Shade which is based on that color was similarly certified. It is also to be understood that the Federal Food and Drug Administration's actions in removing colors from the certified list or adding colors to the certified list or in establishing safe levels of such colors will be followed by those in the meat market and particularly by those interested in color stabilization of meat products in determination of which processes and colors are to be used. Various meat products have been treated in accordance with this invention with the attainment of uniform color which held up well.

This invention can be further understood by reference to the following examples which are given for illustrative purposes only and are not limitative.

*Example I*

One teaspoon (71 grams) of F.D. & C. Red #2 is dissolved in one gallon (3.8 kg.) of lukewarm water, the temperature being 95° F. to 100° F. (35° C. to 38° C.). In order to effect proper solution, the resultant mixture is allowed to stand at 65° F. (18° C.) for 3 to 4 hours after which it is cooled to a temperature of 45° F. (7° C.) preparatory to use. Just prior to using, the solution is shaken thoroughly. Ten ounces (about 300 grams) of the dye/water mixture is added to 100 lbs. (45.4 kg.) of chopped pork in a mixing machine. At the same time spices and seasonings are added in accordance with the meat product desired. For sausage, after blending, the resultant material is stuffed into casings, and the sausage is placed in a refrigerator and held at a temperature of 40° F. (4° C.) for 12 to 14 hours in order to bring out the desired red color.

Sausage prepared in accordance with this example has been kept under normal refrigeration for as long as four weeks without any change in the bright, natural red color produced; the sausage retained its normal flavor and odor. Further, sausage prepared in accordance with this example has been kept out of refrigeration for 7 hours with no noticeable change in color or other factors as flavor.

Similar results are obtained using Christmas Red Shade, a dye available in the paste form and made from F.D. & C. Red #1.

*Example II*

Using F.D. & C. Red #1, which was certified at the time of filing, dry sausage is prepared as above except that after casing the material, the sausage is dried. In the drying procedure the sausage is kept in a drying room heated to a temperature of 55° F. to 60° F. (12° C. to 16° C.) until dry and is then aged at 45° F. to 50° F. (7° C. to 10° C.) for about 30 days. Salami prepared similarly using F.D. & C. Red #2 was dried for a total period of about 90 days before marketing the product. Using the process and coloring agents of this invention, dry sausage and salami have been produced which showed no appreciable color change after 6 months' storage.

The product so prepared had excellent color and taste and retained those characteristics over long periods of time. Preparation of a dry sausage using CSC Strawberry Shade gave similar results. This color material, a liquid as available commercially, also requires the aging steps discussed above.

In making various meat products of this invention, materials normally used in the industry can be employed. For example, table salt, sugar, spices of all kinds, water, sodium nitrate, sodium benzoate, flavorings of various kinds, butylated hydroxyanisole and like materials may be added in varying amounts to produce a wide variety of meat products having the advantageous color stability afforded by this invention.

Among these meat products are Bologna, cooked salami, Mortadella, salami, frankfurters, pork roll, spiced ham, chopped ham, chopped pork, luncheon meats and many others. The meats used in this invention include beef, veal and pork, among others.

With reference to the preparation of one gallon of the aqueous dye solution, generally about 0.5 to 1.5 teaspoons of the coloring matter are sufficient although the amounts may be a bit more or less depending upon the end result desired. The weight will, of course, vary with the dye but, in general, about 50 grams to 200 grams of dye will be added to the gallon of water. Similarly, the amount of dye solution used for 100 pounds of meat or meat mixtures may be as little as 5 fluid ounces and as much as 15 fluid ounces but an amount in the range of 8 fluid ounces to 12 fluid ounces is used normally, and generally 10 fluid ounces is preferred. The best results from the standpoint of the naturalness of the product coupled with color stability have been attained with 10 ounces of the various dye solutions. In terms of weight about 2 to 8 grams of the coloring matter is used per 100 pounds of meat (45.4 kg.) or in other words the final blend contains only about 0.004% to about 0.02% by weight of the coloring matter.

While these various solutions are subject to some variations in temperatures used in their preparation, a temperature of at least about 95° F. (35° C.) must be used. Uniform color is not obtained if the solution is prepared using lower temperatures. For example, if a temperature of 60° F. (15° C.) is used, the color produced is spotty and non-uniform. Higher temperatures may be used; for example, excellent results are attained when the solution is prepared at 120° F. (49° C.). However, temperatures in the range of about 95° F. to 100° F. (35° C. to 38° C.) work well and are usually used.

It will be noted that the color mixture or dye solution is allowed to age or stand at 65° F. for a few hours. This is an important step in the process of this invention; better color mixtures are obtained. During this treatment the difficultly soluble dyes dissolve better, to a greater extent and more uniformly. Temperatures in the range of about 50° F. to about 80° F. can be used but it has been found that a temperature of around 65° F. is effective in relatively short periods of time, about 2–6 hours. Just prior to use the color mixture is shaken well to insure its uniformity. While any solid particles are or have been removed, by filtration, for example, occasionally very small particles are noted and the agitation of the mixture just before using redissolves these and prevents the formation of spots in the final product.

The dyes chemically are the disodium salt of 1-pseudocumylazo-2-naphthol-3,6-disulfonic acid, the trisodium salt of 1-(4-sulfo-1-naphthylazo)-2-naphthol-3,6-disulfonic acid, either alone or in mixtures, with other dyes such as the trisodium salt of 3-carboxy-5-hydroxy-1-p-sulfophenyl-4-p-sulfophenylazopyrazole (F.D. & C. Yellow #5). The mixture of the pyrazole dyes with the monoazo dyes afford different shades such as the CSC Strawberry Red Shade. Further, other monoazo dyes may be used such as F.D. & C. Red #3 (the disodium salt of 9-o-carboxyphenyl-6-hydroxy-2,4,5,7-tetraiodo-3-isoxanthone) and F.D. & C. Red #4 (the disodium salt of 2-(5-sulfo-2,4-xylylazo)-1 - naphthol - 4 - sulfonic acid). Generally, however, F.D. & C. Red #1 and 2, the CSC and the Christmas Red Shade coloring materials are used and preferred.

Examination of prior art processes led to the conclusion that the desired objective of a natural, stable color appearance was unattainable thereby. Accordingly, a number of commercially available food products having a red color were used in an attempt to produce the desired results. Certain of these gave a color that was initially good but was unstable while the others either gave an artificial coloring to the meat and/or colored fat particles as well as imparting an unnatural appearance to the meat.

The mixing of the meat being treated with the aqueous dye is best done in a standard meat mixer. Usually, the mixture is kept cold. The meat is cold, and the results improve with a lowering of the temperature of the meat or mixture. As shown above, the dye solution or mixture is also used cold, its temperature being 45° F. or lower. While the ingredients may be added to the mixer simultaneously, separate additions of the meat and the color mixtures may be effected. It is preferred in some instances. For example, in the preparation of fresh sausage it is best to have the meat mixing in the machine and to add the color mixture to the meat. The mixing generally is effected within 1 minute with reference to 100 pounds of meat. With dry sausage a 2 minute mixing period suffices. Of course, the time may be much longer. The time depends to some extent on the comminuted form of the material. The meat being processed may be in chunk form or it may be ground rather fine, resembling cornmeal, for example. The size used depends upon the product being made and with larger particles a longer mixing time is needed. Normally, the time does not extend beyond 1 hour and is usually 0.5 hour or less.

While the examples have shown the preparation of meat products in casings, the color preservation does not depend on the casing. The color is as stable without the casing as it is with. Thus, the process of this invention is applicable to the production of all varieties of meat products encased or not, canned or open.

The length of time involved in the aging of the final product depends on the nature of the product. In some cases aging for one or two hours will bring out the color while in others several days and even as many as 90 days are required to develop all of the qualities desired in the final product. Thus, the time may range from 2 hours to 90 days and while the color may develop in a relatively short time, longer times may be needed to obtain other properties desired. Usually, the temperatures used in the various aging steps vary from about 35° F. to about 65° F. and the range of 45° F. to 50° F. is most frequently used. The process of this invention does not conceal damage or inferiority of the meat products. Improper handling of the products of this invention leads to deterioration just as it would were the meat not treated by the process of this invention. Spoiled products are easily detected by the usual signs of mold or bad odors. In the preparation of the various meat products listed above, color loss is encountered because of the various handlings and treatments of the meat required to shape the final product. This invention does not make the products appear better or appear to be of more value than they really are; rather the process of the invention replaces the color loss and retains or stabilizes the color throughout the processing so that the products have the natural color appearance that they would have were color losses not encountered.

This invention involves the use of materials and processes which are suitable, acceptable and safe. No deleterious materials or results are involved. As noted above, the fat particles are not colored in this invention and the meat products retain their natural appearances. Concealment of damage or inferiority of products is avoided, for inspection of the fat particles in the products will indicate their amount and character. The meat products of this invention have been appraised by meat retailers and by ultimate consumers. In every instance, a very favorable appraisal resulted and demands for the products resulted.

While the invention has been disclosed herein in connection with certain embodiments and certain compositional and procedural details, it is clear that changes, modifications or equivalents can be used by those skilled in the art; accordingly, such changes within the principles of this invention are intended to be included within the scope of the claims below.

I claim:
1. A process for the production of meat products having stabilized color which process comprises heating a mixture comprising a certified monoazo, substantially red coloring matter and water at a temperature of at least about 95° F. to form a solution containing about 50 to about 200 grams of said coloring matter per gallon of water allowing the resultant solution to stand unheated; adjusting the temperature of the resultant cooled solution to a value not exceeding about 45° F. to produce a cold solution; blending an amount of the resultant cold solution with an amount of meat to add from about 2 to about 8 grams of said coloring matter per 100 pounds of meat; and aging the resultant blend for at least one hour at a temperature between from about 35° F. to about 65° F.

2. A process in accordance with claim 1 in which the resultant blend of meat and coloring matter is aged at a temperature in the range of 45° F. to 50° F.

3. A process in accordance with claim 1 in which said certified coloring matter comprises F.D. & C. Red #2.

4. A process in accordance with claim 1 in which said certified coloring matter comprises F.D. & C. Yellow #5.

5. A process for the production of meat products having stabilized color which process comprises heating a mixture comprising a certified monoazo, substantially red coloring matter and water at a temperature of at least about 95° F. to form a solution containing about 50 to about 200 grams of said coloring matter per gallon of water; holding the resultant solution at a temperature of about 50° F. to about 80° F. for about 2 to about 6 hours; adjusting the temperature of the resultant solution to a value not exceeding about 45° F. to produce a cold solution; blending an amount of the resultant cold solution with an amount of meat to add from about 2 to about 8 grams of said coloring matter per 100 pounds of meat; and aging the resultant blend for at least one hour at a temperature between from about 35° F. to about 65° F.

6. A process in accordance with claim 5 in which the resultant solution is held at a temperature of about 65° F. for about 2 to about 6 hours prior to said adjusting of its temperature.

References Cited in the file of this patent

UNITED STATES PATENTS

| | | |
|---|---|---|
| 1,107,184 | Priban | Aug. 11, 1914 |
| 1,318,109 | Ries | Oct. 7, 1919 |
| 1,729,590 | Morris | Sept. 24, 1929 |
| 2,021,621 | Allen et al. | Nov. 19, 1935 |
| 2,477,767 | Remer | Aug. 2, 1949 |